United States Patent [19]  [11] Patent Number: 4,978,176
Smith  [45] Date of Patent: Dec. 18, 1990

[54] SPOKED WHEEL

[76] Inventor: Bruce N. Smith, P.O. Box 197, New Castle, N.H. 03854

[21] Appl. No.: 370,023

[22] Filed: Jun. 22, 1989

[51] Int. Cl.$^5$ .............................................. B60B 1/04
[52] U.S. Cl. ..................................... 301/104; 301/58; 301/59
[58] Field of Search ...................... 301/55, 56, 57, 58, 301/59, 104, 105 B

[56] References Cited

U.S. PATENT DOCUMENTS

| | | | |
|---|---|---|---|
| 1,083,682 | 1/1914 | Hill | 301/58 |
| 1,492,850 | 5/1924 | Hubbard | 301/105 B |
| 3,199,922 | 10/1965 | Krenz | 301/59 |
| 3,871,710 | 3/1975 | Dian et al. | 301/105 B |

FOREIGN PATENT DOCUMENTS

| | | | |
|---|---|---|---|
| 534646 | 1/1922 | France | 301/59 |
| 17956 | 7/1903 | Sweden | 301/59 |
| 9580 | of 1892 | United Kingdom | 301/59 |
| 26755 | of 1909 | United Kingdom | 301/59 |

Primary Examiner—Russell D. Stormer

[57] ABSTRACT

A composite wheel using preheaded spokes insertable in a rim, a hub notched to receive and position the spokes and two plastic resin hub inserts compressively mating with the hub so as to secure the spokes therebetween. A method of assembly is also described.

5 Claims, 2 Drawing Sheets

SPOKED WHEEL

BACKGROUND OF THE INVENTION

1. Field of the Invention

The invention relates to spoked wheels.

2. Relation to the Prior Art

Wheels for small carts, tricycles, lawnmowers and miscellaneous uses have evolved for economy of manufacture. A wheel can be molded in one piece of plastic and then a tire stretched over its rim. The one piece wheel has been made with a solid center or with molded-in spokes for decorative appearance. A common metal wheel uses two stamped pieces of steel welded together with a tube inserted at the center for an axle bearing and a tire stretched over the rim. The plastic one uses two pieces while the metal one uses four. Because of a distrust for plastic, people will pay more for the metal one. People will also pay more for a spoked wheel because traditionally it is accepted as higher quality and looks more elegant.

Hand-fitted spokes commonly are engaged at the hub and sprung into holes in the rim where they are secured by threaded fasteners. This involves considerable handwork and thus becomes expensive as a manufacturing process. To reduce this expense, sophisticated equipment has been developed with which the spokes are automatically positioned and welded to the rim, which is thereafter curved into a circle and its ends welded together. A hub is then positioned at the center and the spoke ends are fitted into slots in the hub and welded. Disks, simultaneously welded over the ends of the hub, provide axle bearings.

This works well and is economical in manufacture. However the welded ends are too rigid and do not allow for the constantly changing stresses of a rolling wheel. Spokes held in place less rigidly have proven to last longer.

SUMMARY OF THE INVENTION

A wheel assembly of a rim, preheaded spokes insertable in the rim, a hub notched to receive the spokes and two hub inserts compressively secured to opposite ends of the hub holding the spokes in place. A method of wheel assembly in which spokes are inserted at the rim; positioned in notches in a hub; and secured by compressive fitting of hub inserts into the hub.

Further features of the invention will become apparent upon reading the following description together with the Drawing.

DESCRIPTION OF THE PREFERRED EMBODIMENTS

Figure 1:
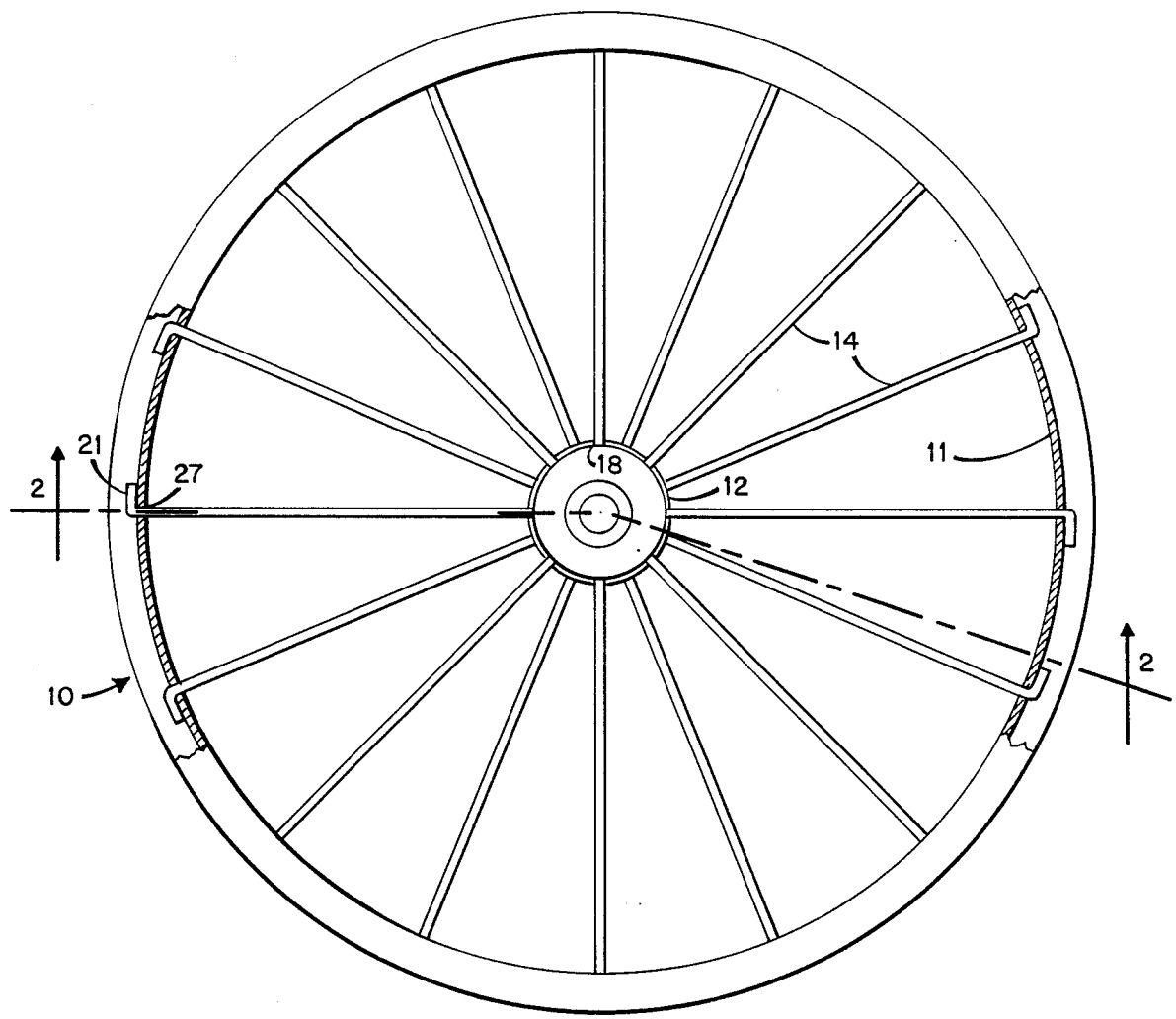
FIG. 1 is a front elevation of a wheel according to the invention partially cut-a-way at the rim to show spoke heads.

Wheel 10 in FIG. 1 has rim 11 and hub 12. Rim 11 is connected to hub 12 by sixteen spokes 14. Rim 11 may be molded in plastic or may be metal, either formed or cast.

Figure 2:
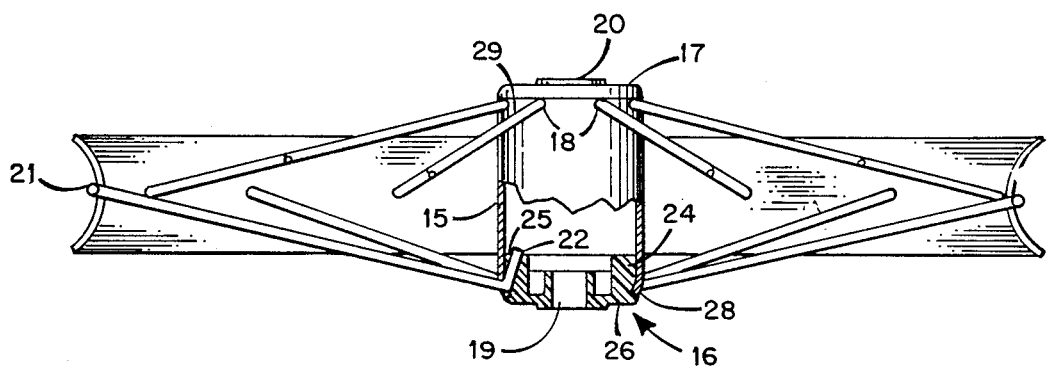
FIG. 2 is a partial cross section through 2—2 of FIG. 1 showing hub details.

Hub cylinder 15 and hub inserts 16 and 17 make up hub 12 as illustrated in FIG. 2. Hub cylinder 15 is preferably metal such as 16 gauge steel and is notched at ends 28 and 29 with notches 18 to receive spokes 14. Metal is desirable for appearance as well as for ease of crimping to hold inserts 16 and 17 securely.

Hub inserts 16 and 17 can also be made of metal, but are preferably molded in plastic such as nylon, acetal resin or polytetrafluoroethylene. By molding inserts 16 and 17 from a low friction plastic, central apertures 19 and 20 respectively can serve well as axle bearings.

Steel spokes 14, are depicted as having substantially right angle bends at each end. These bends are rotated substantially 90° with respect to each other to provide outer spokehead 21 and inner spokehead 22. One half inch of bent end provides a suitable spokehead.

Hub insert 16 has outer cylindrical portion 24 with an outer diameter matching the inner diameter of hub 15. Portion 24 has recesses 25 for receiving spokeheads 22. Hub insert 16 has cap portion 26 of greater diameter than cylindrical portion 24. Hub insert 17 is the same as hub insert 16.

In assembly, rim 11 is made in any conventional way complete with holes 27 for spokes. Spokeheads 21 are inserted through holes 27 to engage rim 11. Spokeheads 22 are inserted in notches 18. Next hub inserts 16 and 17 are positioned so that recesses 25 match spokeheads 22 and then they are pushed into cylinder 15 until stopped by cap portions 26. End 28 and end 29 of hub 15 are then pressed in against hub insert portions 24 to provide a compression engagement.

One quick way of pressing or crimping end 28 and 29 inward is with a double cone press in which the cones have slots to pass over spokes 14. When the cones are forced together over hub inserts 16 and 17, ends 28 and 29 are forced into the plastic of portion 24.

A wheel made according to FIGS. 1 and 2 to take a 16×1.75 tire (40.65 cm od×4.45 cm) used the following:

Conventional steel rim made of 16 gauge steel.

Sixteen spokes as described above made of 10 gauge steel.

Hub of 16 gauge steel cylinder 4.76 cm od×6.35 cm long.

Hub insert of acetal resin with cap portion 25, 4.45 cm od and portion 24, 4.37 cm od. Portion 24 is 0.64 cm thick and 1.11 cm deep.

Figure 3:
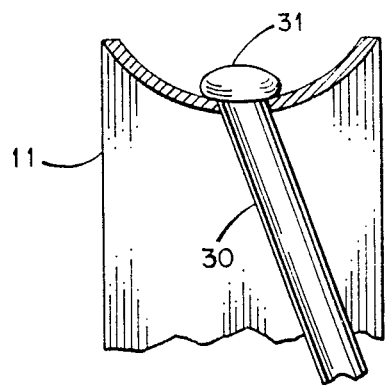
FIG. 3 is a detail of a wheel rim showing a second embodiment of a spoke head.

FIG. 3 is cross section rim detail in which spoke 30 has a mushroom head at rim 11. For this embodiment the hub end of the spoke would be bent and that end would be inserted through the rim from the outside first. It is also within the invention to reverse spoke 30 to put the mushroom head in the hub. One end is bent for insertion purposes.

Figure 4:
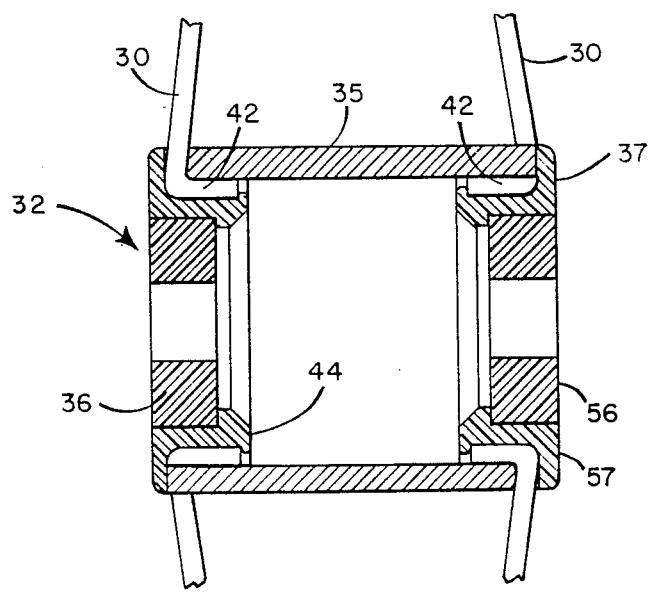
FIG. 4 is a cross section detail of a second embodiment of a wheel hub.

FIG. 4 is a cross section of a second embodiment of a hub assembly. Hub 32 uses a compression fit between hub inserts 36 and 37 and spokeheads 42 to hold spokes, hub inserts and hub cylinder together. Cylindrical portion 44 of hub insert 36 is molded smaller in diameter than the inside diameter of hub cylinder 35, but large enough in diameter that there is not room for spokeheads 42. Inserts 36 and 37 are forced into hub cylinder 35 after the spokes are in place giving a compression engagement of the parts.

Figure 5:
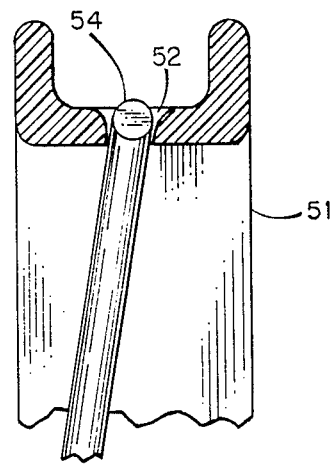
FIG. 5 is a cross section detail of a second embodiment of a wheel rim.

FIG. 5 illustrates a molded plastic rim 51 having a molded recess 52 for spokehead 54. This reduces deleterious interaction between the tire and spokeheads and is easier to provide in molded plastic then in metal. Thus for some purposes the invention contemplates the use of plastic as well as metal rims.

In FIG. 4, insert 37 is depicted with two parts. Inner part 56 provides a bearing and outer part 57 provides the compression fit against spokeheads 42. Insert 37 can be molded in one piece or made of two separate plastics having the optimum characteristics for their particular use. Part 56 can also be a press-fit ball bearing ring or the like.

While the invention has been described with respect to specific embodiments, many variations are contemplated as within the scope of the invention. Several variations of compression fits for the hub inserts are considered. Recesses 25 in hub inserts 16 and 17 of FIG. 2 can be made too small for spokeheads 22 so as to provide a strong compression engagement when the inserts are forced in place. Annular locking ridges can be provided to give further security to the compression fits.

I claim:

1. A wheel comprising:
   a. a hug cylinder having first and second open ends;
   b. a rim having a plurality of holes for receiving spokes;
   c. first and second hub inserts mating with said first and second open ends, said hub inserts being made of a low friction plastic with central apertures designed to serve as axle bearings, each insert having a cylindrical portion that fits inside said cylinder with insufficient space between said cylindrical portion and said hub cylinder for said spokeheads, whereby when said hub inserts are forced into said hub cylinder with said spokeheads in places, a compressive fit is made securing said spokes and said inserts in said hub cylinder; and,
   d. a plurality of spokes each having first and second spokeheads, at least one spokehead of each spoke consisting of a substantially right angle bend, the first spokehead of each spoke engaged in a respective one of said holes and the second spokehead of each spoke secured to said hub by compressive engagement of one of said hub inserts into one of said open ends securing said second end between said insert and said hub cylinder.

2. A wheel according to claim 1 wherein each of said first and second hub inserts has recesses spaced around it for engagement with respective spokeheads.

3. A wheel according to claim 1 wherein each of said open ends is pressed in against a respective hub insert providing said compressive engagement.

4. A wheel according to claim 1 wherein said first and second spokeheads consist of substantially right angle bends at right angles to each other.

5. A method of assembling a composite wheel comprising:
   a. constructing a wheel rim having a plurality of spaced holes for spokes;
   b. forming spokeheads on a plurality of spokes, at least one spokehead on each spoke being a bent end;
   c. forming a metal hub cylinder with two open ends and notches in each of said open ends for receiving said spokes;
   d. molding first and second plastic hub inserts mating with said two open ends;
   e. inserting said spokes in said holes by passing said bent ends into said holes;
   f. positioning successive ones of said spokes in notches in alternating ones of said open ends;
   g. compressively fitting said hub inserts into said open ends to provide compressive engagement between said hub cylinder and said hub inserts securing said spokes therebetween; and,
   h. forming said open ends inward to securely grip said first and second plastic hub inserts.

* * * * *